(12) United States Patent
Turner et al.

(10) Patent No.: US 6,438,137 B1
(45) Date of Patent: *Aug. 20, 2002

(54) PACKET-BASED TRUNKING

(75) Inventors: R. Brough Turner, Newton Corner; Harry Norris, Maynard, both of MA (US); Julius Rothschild, Des Plaines, IL (US)

(73) Assignee: NMS Communications Corporation, Framingham, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,305

(22) Filed: Dec. 22, 1997

(51) Int. Cl.[7] .............................. H04J 3/16; H04J 3/22
(52) U.S. Cl. ........................ 370/466; 370/471
(58) Field of Search ................ 370/466, 464, 370/465, 467, 468, 469, 470, 471, 474, 355, 356, 354, 400, 401, 402, 389, 392

(56) References Cited

U.S. PATENT DOCUMENTS

| | | | | |
|---|---|---|---|---|
| 5,583,855 A | * | 12/1996 | Ball | 370/376 |
| 5,666,362 A | * | 9/1997 | Chen et al. | 370/420 |
| 5,781,743 A | * | 7/1998 | Matsuno et al. | 709/228 |
| 5,917,828 A | * | 6/1999 | Thompson | 370/474 |
| 5,926,477 A | * | 7/1999 | Shirokura et al. | 370/395 |
| 5,940,598 A | * | 8/1999 | Strauss et al. | 370/466 |
| 5,946,309 A | * | 8/1999 | Westberg et al. | 370/395 |
| 5,987,022 A | * | 11/1999 | Geiger et al. | 370/477 |
| 6,002,692 A | * | 12/1999 | Wills | 370/465 |
| 6,005,871 A | * | 12/1999 | Petersen et al. | 370/474 |
| 6,016,507 A | * | 1/2000 | Carroll et al. | 709/217 |
| 6,018,530 A | * | 1/2000 | Chakravorty | 370/471 |
| 6,061,329 A | * | 5/2000 | Abe | 370/228 |
| 6,061,349 A | * | 5/2000 | Coile et al. | 370/389 |
| 6,198,751 B1 | * | 3/2001 | Dorsey et al. | 370/466 |

\* cited by examiner

Primary Examiner—Dang Ton
Assistant Examiner—Brian Nguyen
(74) Attorney, Agent, or Firm—Mintz, Levin, Cohn, Ferris, Glovsky & Popeo, P.C.

(57) ABSTRACT

A network communication system includes a packet translator operatively connected between a tributary network port and a trunk network port. A tributary format is communicated through the tributary network ports and includes tributary packets that each include a header field and a data field. An aggregate format is communicated through the trunk network port, and includes a packet that includes an aggregate header field and the data fields.

44 Claims, 2 Drawing Sheets

PACKET-BASED TRUNKING

FIELD OF THE INVENTION

This invention relates to systems for transmitting data over packet-based networks.

BACKGROUND OF THE INVENTION

It is known to send real-time or near-real-time information over packet-based networks, such as the internet. In internet telephony, for example, a sending system digitizes a talker's speech and sends it over the internet in a sequence of packets to a receiving system. The receiving system then reassembles the speech and plays it back to a listener. Each of the packets transferred over the network during this process typically includes a header containing routing information followed by a data field containing the digitized speech data. To reduce noticeable lags, which are objectionable to most listeners, it can be beneficial to assemble short packets and immediately send them over the network, instead of waiting to accumulate a larger amount of data.

SUMMARY OF THE INVENTION

In one general aspect, the invention features a network communication system that includes a packet translator operatively connected between a tributary network port and a trunk network port. A tributary format is communicated through the tributary network ports and includes tributary packets that each include a header field and a data field. An aggregate format is communicated through the trunk network port, and includes a packet that includes an aggregate header field and the data fields.

The aggregate format can include a packet that includes an aggregate header field and a list with variable-length entries each including one of the data fields. The aggregate header field can include an aggregate packet format update field including an indication of a change in the aggregate packets and a reference to a position in the list. The aggregate packet format update field can include an indication of an addition of data from a tributary packet, a reference to a position in the list, and a destination derived from the tributary packet. The aggregate packet format update field can also include an indication of a deletion of data from a tributary packet in the aggregate packet and a reference to a position in the list. The tributary packets can each include a compressed header field compressed according to a single-destination header compression method. The system can include means responsive to an acknowledgment of receipt of a change tag to cause the packet translator to assemble aggregate packets with the same change tag until the system receives the acknowledgement. It can also include means for inserting a header checksum in each of the aggregate packets. It can further include means responsive to a fragmentation indication to reduce a size of the aggregate packets.

In another general aspect, the invention features a network communication method that includes assembling for each of a plurality of aggregate packets a list that includes a plurality of data fields and providing for each of the packets a header that includes destination information. The method also includes assembling for at least some of the aggregate packets a change tag indicating a position of a field in the list to be changed, and sending the aggregate packets that include the list, the header, and any change tag over a network from a source to a destination according to the destination information.

The method can further include the step of receiving tributary packets from different tributary nodes each including a header and a data field, the step of assembling a list can include assembling the data fields from the tributary packets to form the list of data fields, and the step of assembling a change tag can include destination information derived from one of the tributary packets in the change tag. The step of receiving tributary packets can receive tributary packets from a single-destination connection that employs header compression. The method can also include receiving an acknowledgement of receipt of a change tag, and the step of sending can send aggregate packets with the same change tag until then. The steps of assembling and sending can operate on data fields that include real-time digitized information. The steps of assembling and sending can operate on data fields that include digitized voice signals. The method can further include receiving a fragmentation indication after the step of sending, and reducing a size of the aggregate packets in response to the fragmentation indication. The step of assembling a list can assemble a list with variable-length entries. It can also assemble a list with some null entries.

The method can further include interpreting the change tags at the destination, and retrieving data from the fields from different ones of the packets assembled in the step of assembling at the destination based on the contents of the tags. The change tag can be an add tag that identifies a new field in the list, and the retrieving step can respond to the add tag by retrieving data from the new field. The change tag can also be a delete tag that identifies a deleted field in the list, and the retrieving step can respond to the delete tag by ceasing to retrieve data from the deleted field. The method can further include constructing tributary packets from the data fields retrieved in the step of retrieving using destination information obtained from the change tag. The packets constructed in the step of constructing can be sent over a connection that employs header compression.

In a further general aspect, the invention features a network communication method that includes the steps of receiving aggregate packets from a source, the packets each including a list that includes a plurality of data fields and a header, where at least some of the packets include a change tag indicating a position of a field in the list to be changed. The method also includes interpreting the change tags, and retrieving different data fields from different aggregate packets at the destination based on the contents of the change tags.

The method can also include constructing tributary packets from the data fields retrieved in the step of retrieving using destination information obtained from the change tag. The packets constructed in the step of constructing can be sent over a connection that employs header compression. The method can further include acknowledging receipt of a change tag. The method can further include verifying a header checksum in each of the aggregate packets. The steps of receiving and retrieving can operate on data fields that include real-time digitized information. The steps of receiving and retrieving can operate on data fields that include digitized voice signals. The method can further include detecting fragmentation of the aggregate packets and providing a fragmentation indication. One of the change tags can be an add tag that identifies a new field in the list, and the retrieving step can respond to the add tag by retrieving data from the new field. One of the change tags can also be a delete tag that identifies a deleted field in the list, and the retrieving step can respond to the delete tag by ceasing to retrieve data from the deleted field. The step of retrieving can retrieve variable-length entries from the list.

In another general aspect, the invention features a memory for storing data for access by a node on a network that includes an aggregate packet structure stored in the memory. The aggregate packet structure can include a list that includes separate data fields stored in the memory, a header stored in the memory that includes destination information for the first aggregate packet, and a change tag stored in the memory. The change tag includes a position indication stored in the memory and indicating a position of a field in the list to be changed.

The change tag can include one of an add tag and a subtract tag stored in the memory. The aggregate packet can further include a header checksum stored in the memory. The memory can further include a second aggregate packet structure stored in the memory. This second aggregate packet structure can include a second list that includes a plurality of separate data fields stored in the memory, a second header stored in the memory that includes destination information for the second aggregate packet, and a copy of the first change tag stored in the memory. The copy of the change tag can include a position indication stored in the memory and indicating a position of the field in the list to be changed.

Systems according to the invention may permit significant bandwidth reductions in network communication, including near-real-time or real-time network communication. Because header information is stripped from shorter packets, and data from these packets are placed in aggregate packets that carry a proportionally smaller amount of header information, the overall burden of the network is reduced. This can result in reduced average network latency or in an increase in the number of packets that can be sent over a network. Systems according to the invention can also reduce header overhead while maintaining low network latency. Such systems can exhibit better overall efficiency than systems that send a number of individual packets in a single session, and can exhibit better latency specifications than systems that block short packets into larger ones.

Operation of systems according to the invention can be made transparent to end-users of the network. The bandwidth savings available from such systems can therefore be immediately available to individual users of a network even if they are only temporarily connected. And these end users do not need to upgrade or modify their systems in any way.

Systems according to certain aspects of the invention can also be beneficial in that they can robustly handle varying levels of traffic. By employing aggregate packets with variable-length lists of variable-length entries, such systems can efficiently handle a variable number of tributary packets and sequences of packets of varying lengths. This can permit these systems to operate in networks with different statistical characteristics, networks with dynamically changing traffic patterns, and/or in networks to which varying types of tributaries are attached at any given moment.

Systems according to the invention may also have an impact on the statistical characteristics of network performance. This is particularly beneficial in environments where a network is optimized to manage larger packets than those typically sent over the network, because smaller packets are consolidated into larger ones. Conversely, this facet of the invention can allow a designer to optimize his or her network configuration for larger packets, which tends to improve network efficiency.

DESCRIPTION OF AN ILLUSTRATIVE EMBODIMENT

Figure 1:
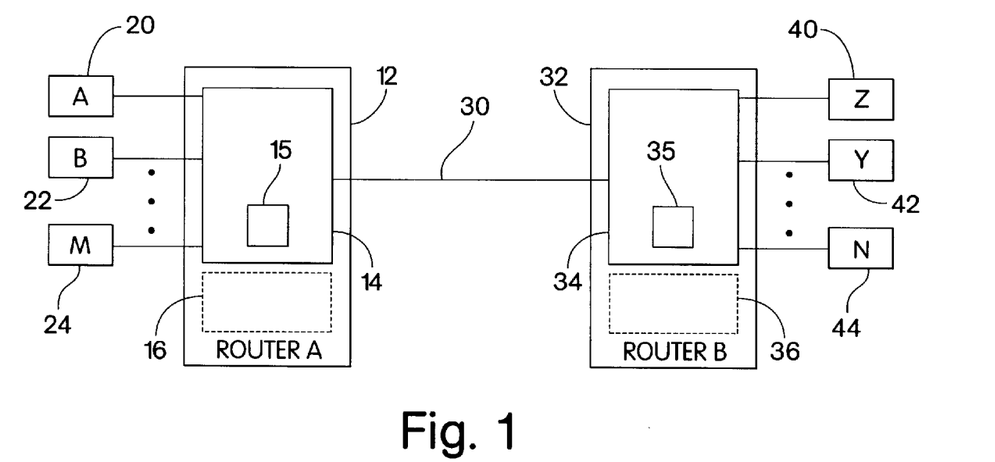
FIG. 1 is a block diagram of an illustrative network including a trunking system according to the invention.

Referring to FIG. 1, an illustrative network 10 including a trunking system according to the invention can include a first set of tributary nodes 20, 22, 24 and a second set of tributary nodes 40, 42, 44 that are interconnected by two aggregating routers 12 and 32, and a network communication channel 30. The first aggregating router 12 includes a packet translator 14, which has bidirectional tributary ports operatively connected to ports of the tributary nodes in the first set, and a bidirectional aggregating network port operatively connected to the communication channel. The second aggregating router 32 similarly includes a packet translator 34, which has bidirectional tributary ports operatively connected to ports of the tributary nodes in the second set, and a bidirectional aggregating network port operatively connected to the communication channel. While the packet translators described in the illustrative embodiment are bidirectional, it is also possible to implement unidirectional (half-duplex) systems that employ principles of the invention. The communication channel and other paths in the system can be part of a global packet-based network (e.g., the internet), a local area network, or any other suitable network. Packet translators 14, 34 include memories 15, 25, respectively, for storing aggregate packet structures as described below with respect to FIGS. 2–4 for access by the nodes 20, 22, 24, and 40, 42, 44, respectively.

Both aggregating routers 12, 32 incorporate conventional routing circuitry 16, 36, which can perform conventional routing of packet-switched information, although it is also possible to provide dedicated trunking capabilities separate from any other routing circuitry. The tributary nodes can be ordinary network nodes that are operatively connected to other nodes and routers in the network, as well as to each other through additional network paths of varying capacity. The tributary nodes and aggregating routers shown in FIG. 1 can also be operatively connected via intermediate nodes. As is conventional, each node typically includes electronic circuitry, which can include a programmed processor, storage, and a network interface circuit.

In operation, referring to FIGS. 1–4, when a first tributary node (e.g., 20) wishes to communicate with a second tributary node (e.g., 40), it sends a succession of packets through a network via the aggregating routers 12, 32. Each of these packets 50 begins with a header 52 containing routing information that conveys to routers in the network the intended destination of the packet. The header can be a simple header or it can include a sequence of header information representing the successive application of different protocols. For example, a packet's header may include an IP header, a UDP header, and an RTP header. A data field 54, which may be a variable-length data field, follows the header and includes the data to be sent over the network. The data field can include text, programs, or other data as well as real-time or near-real-time information, such as voice data, video data, or control signals.

Figure 2A:
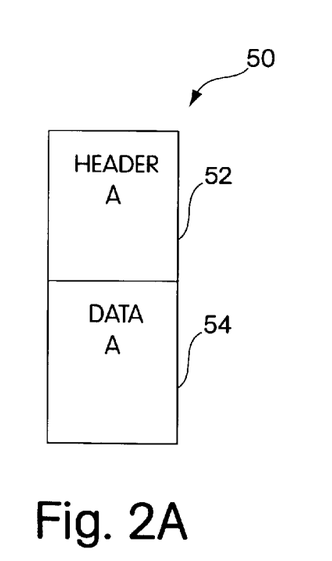
FIG. 2A is a data diagram for a representative packet to be sent from a first tributary node in the network of FIG. 1.
Figure 2B:
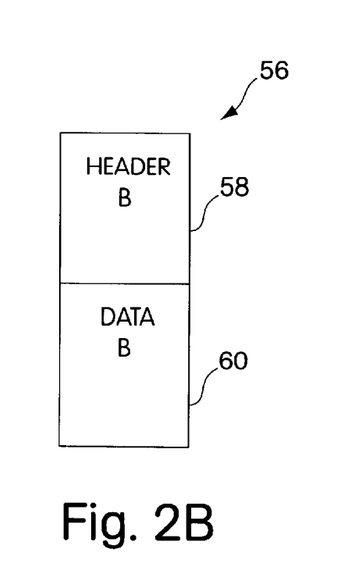
FIG. 2B is a data diagram for a representative packet to be sent from a second tributary node in the network of FIG. 1.

Other tributary nodes (e.g., 22) can also communicate with other remote tributary nodes (e.g., 42) in a similar manner. Each packet 56 sent by these nodes similarly includes a header 58 and a data field 60. Generally the headers employ the same format as the headers sent by other tributary nodes, but data conveyed may or may not share same format. The two tributary communications may employ the same or different packet rates.

As is generally the case in network communication, the transmitted packets are routed by different routers between nodes in the network. Conventional routers generally store and examine a packet's header and determine the best path through which to send the packet. For example, a packet generated in New York bound for Los Angeles might be routed by routers in several different inland cities before reaching its destination. The path assigned to each packet can depend on loading conditions in different parts of the network, and other factors which need not be discussed here.

When the first packet in a sequence from the first tributary node 20 reaches one of the aggregating routers 12, the router first reads the packet's header to determine its destination. Depending on its destination, the router may either directly route the packet in a conventional way via the conventional routing circuitry 16, or it may attempt to set up an aggregate routing connection to a destination router, which may be one of a number of different aggregating routers. Subsequent packets in the same sequence that the router detects will employ the same connection. The routers can determine whether to use aggregate routing based on a number of factors, including: network conditions, proximity and availability of remote aggregating routers, quality of service required, and current router state. It is also possible for a node to explicitly request aggregate routing during call set-up, instead of allowing the router to determine how to route a call.

Figures 3, 4:
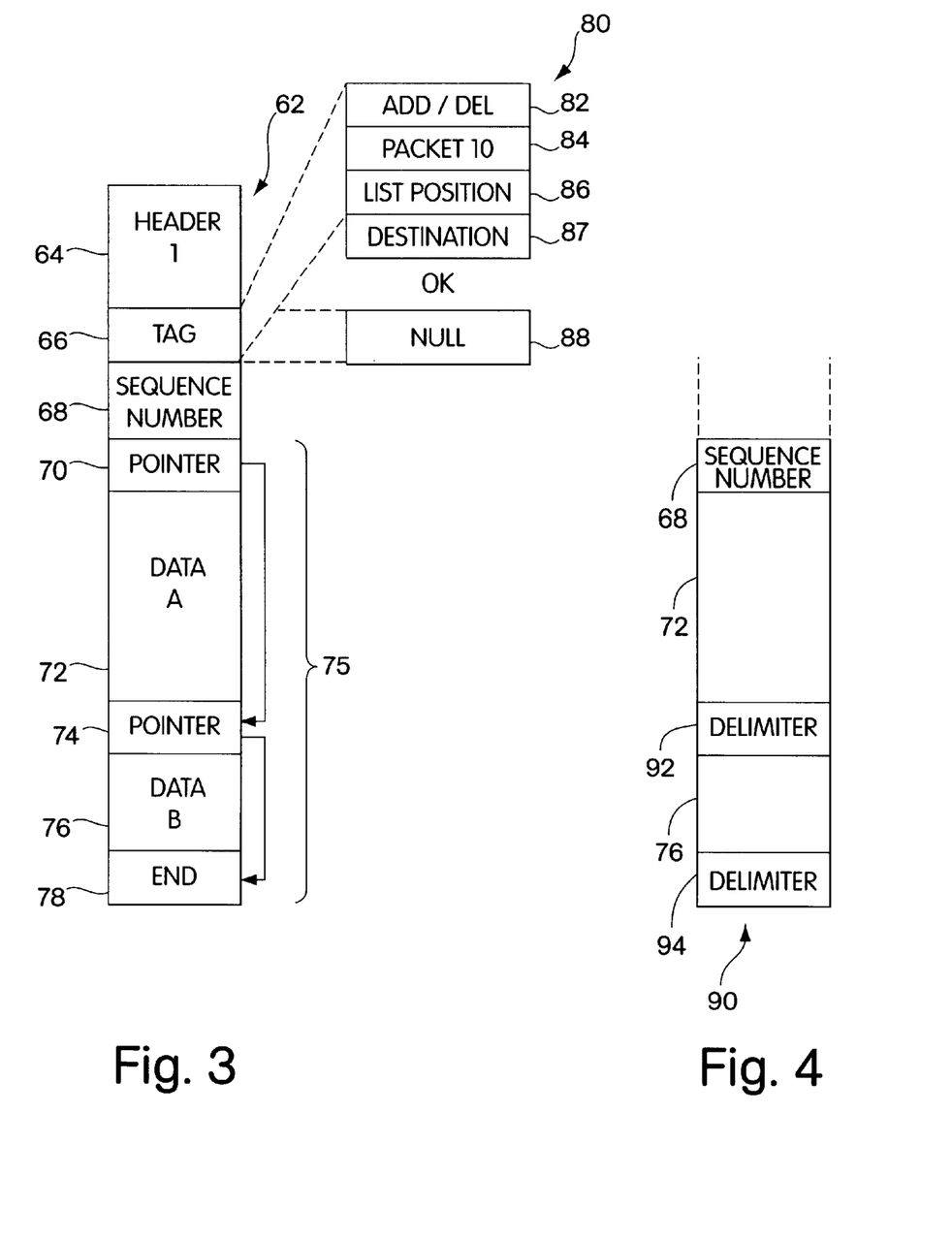
FIG. 3 is a data diagram for a representative aggregate packet, including the packets represented in FIGS. 2A and 2B, to be sent by a first aggregating router in the network of FIG. 1.
FIG. 4 is a partial alternative data diagram for the packet represented in FIG. 3.
Figure 3:
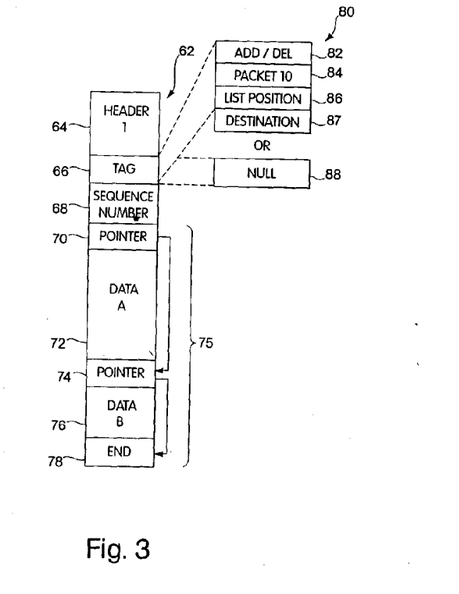

If aggregate routing is selected, the router 12 uses its packet translator 14 to process the packet before routing. The packet translator operates by accumulating a number of packets 50, 56 from different tributary nodes (e.g., 20, 22), and assembling them to form an aggregate packet 62, which it sends either directly or via its routing circuitry 16 to a receiving aggregating router. The receiving aggregating router's packet translator 34 extracts the data for each packet from the aggregate packet, reconstructs the tributary packets, and sends them to their destination tributary nodes (e.g., 40,42), either directly or via intermediate routers. It is contemplated that one aggregating router will be able to simultaneously assemble and send aggregate packets to a number of different receiving routers (e.g., in different cities). The aggregate packet 62 can be stored in the memories 15, 35 for access by the nodes 20, 22, 24 or 40, 42, 44.

Each aggregate packet 62 includes a header 64, which can have the same format as other headers on the network. The header is followed by a tag field 66, which is followed by a sequence number 68. The sequence number is followed by a list 75, which includes the data field for each of the packets received from the tributaries (72, 76).

The list 75 includes a mechanism allowing a receiving router to differentiate between its entries and is preferably a list that can accommodate a variable number of variable-length fields. It can include a linked list in which a first pointer 70 indicates the beginning of a subsequent data field by pointing to the next pointer 74, although other types of linked lists may also be used, such as doubly-linked lists, or linked lists with redundant pointer tables. An end entry 78 can be used to mark the end of the packet.

As shown in FIG. 4, the list 75 can also be a delimited list. In a delimited list, the data directly follows the packet's sequence number 68 and a deliminer 92 is placed at the end of each data field (e.g., 72) to indicate that the next data field 76 is to begin. A final deliminer 94 can indicate the end of the packet. While it is also possible to allocate a fixed amount of space to each data field in an aggregate packet and to maintain a fixed number of entries, such a system will be less versatile in many networks.

The tag field 66 of an aggregate header is a null field 88 unless a change to the make-up of the aggregate packet has taken place. When such a change takes place, the sending router inserts a change tag 80 in the aggregate packet. The receiving router interprets this change tag to determine how to retrieve data from the aggregate packet.

The change tag 80 includes an add/delete flag 82, a packet I.D. field 84, a list position field 86, and a destination address field of 87. The add/delete flag indicates whether the change tag signals an addition to the list 75 or a deletion from the list. The packet I.D. field includes an identifier that indicates which aggregate packet was first affected by the change. The list position field indicates the position in the list at which the change is to take place. The destination address is only provided in add tags, and is derived from the header of the tributary packet that is being added. In this embodiment, only a single change tag is included in any given aggregate packet, but it is possible to provide a mechanism that allows multiple change tags in a packet.

The addition of a connection employing aggregate routing will now be described. When the packet translator 14 of the first aggregating router 12 receives a first packet 50 from a first tributary node 20 to be routed to a second tributary node 40 that is connected to a second aggregating router 32, it copies the data from the data field 54 in the first tributary packet into a first entry 72 in the list 75, usually at one end of the list. The packet translator also adds a change tag 80 to the tag field of the aggregate packet 62.

The change tag 80 includes the information required by the receiving router to reconstruct the first packet. The receiving router uses the tag's list position 86 to retrieve the data 54 from the packet, and uses the destination address 87 to reconstruct its header. The receiving router also stores the destination address in a table of current destination addresses it maintains for the various fields in the aggregate packet 62, so that the sending router only needs to supply destination addresses when the aggregate packet changes its composition. Subsequent packets having the same destination can therefore be sent unburdened by destination address data.

The receiving router also acknowledges receipt of the change tag 80. Until the sending router receives this acknowledgment from the receiving router, it will continue to send the change tag in every packet. This prevents loss of an aggregate packet from resulting in a loss of synchronization between the second aggregating router and the list 75 in the aggregate packet. Alternatively, the aggregating router can periodically send its entire state in order to avoid the effects of transmission errors.

Systems according to invention are particularly useful in conveying communications across a channel that has low bandwidth, or which is expensive. For example, the first group of tributary nodes 20, 22, 24 can be located near the first aggregating router 12 at a first location, and the second set of tributary nodes 40, 42, 44 can be located near the second aggregating router 32 at a location remote from the first, such as in another city, or another building. Systems according to the invention may also provide benefits to communication between nodes that are not physically remote, but are remote for the purposes of the network because they can only be reached through a channel whose capacity is a limitation on operating cost or performance.

Systems according to the invention can provide significant benefits to real-time or near-real-time network systems (e.g., systems using RTP/IP or UDP/IP), although benefits according to the invention may also still be available to non-real-time networks. Real-time networks may guarantee a certain minimum latency, and generally employ a sequence number to determine if packets are dropped or received out of sequence, but typically do not provide for resending of dropped packets. Since change tags 80 are sent repeatedly until they are acknowledged, the aggregating packet communication system is immune to a small number of dropped packets. If more than a certain number of packets is dropped, such as when a router between a pair of aggregating routers fails, the receiving router in the pair will detect this condition and return an indication that a catastrophic failure has occurred. This will cause the sending router in the pair to reinitialize the aggregate packet communication.

Systems according to this invention are also particularly well suited to applications that send a relatively steady stream of packets such as voice or video applications. Since voice calls and video feeds are often set up for relatively long periods, change tags need only be sent infrequently, reducing the amount of header data sent by the aggregating routers. And since the list in the aggregate packet can have a variable number of variable-length entries, the list can handle compressed packets of different sizes, such as those that are generated by many audio and video compression methods. Furthermore, when speakers in telephone conversations leave periods of silence, which are not generally transmitted as tributary packets, these lulls only result in short null entries in the aggregate packet list.

Aggregate packets can be sent periodically, when they reach a certain fill level, or according to another strategy. If the aggregating router 12 runs at the same packet rate as the fastest of its tributaries 20, 22 and 24, it will introduce a maximum latency of one interval at this fastest rate. It is also possible to run the aggregating routers either slower or faster than this rate, however, depending on the characteristics and needs of the system.

When aggregate packets become too large, they may become fragmented in the network and lead to communication inefficiency. The destination aggregating router 32 can detect this fragmentation, however, and notify the sending router 12. When the sending router receives this notification, it can split aggregate packets into groups of smaller aggregate packets.

Tributary nodes may also include a quality-of-service field in their headers. Aggregating routers according to the invention can consult this field to determine how quickly the packet needs to be sent. For example, an aggregating router may fill an aggregate packet until the quality-of-service indicator in one of the packets requires that the packet be sent. When most of the packets have lower quality-of-service requirements, the aggregating router may be able to wait longer and send larger aggregate packets, which can be more efficient to transmit.

The change tags 80 sent in the aggregate packets 62 also include a header checksum. This checksum allows a receiving router 32 to ignore or correct change tags corrupted in transit. This can help to prevent the loss of synchronization between pointers and data entries in the lists contained in the aggregate packets. Checksums or other data detection and/or data correction methods may also be used for the data, although in many real-time applications the effect of corruption of the data is insufficient to warrant the overhead of these methods. Even if one of a packet's pointers becomes corrupt during transit, for example, and as a result all of the data in its list is corrupted, such an error will not spread to any further packets, as long as the headers have been received correctly.

The aggregating routers 12, 32 can also employ header compression in the digital tributary channels if one of the tributary nodes 20 is connected to one of the aggregating routers via a dedicated channel, such as a point-to-point protocol (PPP) link. Such header compression systems are known in the art, and operate by removing redundant destination information from a series of packets destined for a single node. By combining these two methods, the bandwidth of the entire channel from one tributary node (e.g., 20) in a first set to another tributary node (e.g., 40) in a second set can be reduced. Such an approach may be particularly advantageous in systems used by internet service providers (ISP's) where a number of individual subscribers connect to a routing installation via modems over local telephone connections that can use header compression, and where remote routing installations are separated by communication channels that can carry aggregate packets.

The aggregating routers may also provide a method of identifying duplicate entries in aggregate packets. If an aggregating router detects a new packet that already exists in an aggregate packet it is accumulating it can include a code that so indicates, instead of including the literal duplicate tributary packet data in the aggregate packet. This feature can be applied to regular network traffic, but it is particularly well suited to broadcast or multi-channel data acquisition capabilities. A broadcast server who wishes to send an identical packet to a number of destinations can take advantage of the trunking capabilities in the network by creating a packet that includes a single data field bound for a number of destinations. Conversely, an acquisition station, such as a surveillance or telemetry monitoring station, that receives similar data from a number of stations may also benefit. Note that broadcast stations can construct and send aggregate packets without receiving tributary packets and acquisition stations may interpret or store received aggregate packets without recreating tributary packets.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A network communication system, comprising:
   a plurality of tributary network ports,
   a trunk network port, and
   a packet translator operatively connected between the tributary network ports and the trunk network port, the packet translator configured to translate data between a tributary format, communicated through the tributary network ports, of a plurality of tributary packets that each include a tributary header field and a data field, and an aggregate format of an aggregate packet communicated through the trunk network port that includes an aggregate header field and the data field of each of the tributary packets, the aggregate header including less than all of the information of the tributary header of at least one of the tributary packets associated with the aggregate packet;

wherein the aggregate header field includes tributary header data from a tributary header only if the tributary header data is relatively new to the packet translator, and wherein the tributary header data is considered relatively new if the packet translator has not received an indication of receipt of the tributary header data.

2. The system of claim 1 wherein the packet translator is configured to translate data between a tributary format communicated through the tributary network ports that includes a plurality of tributary packets that each include a header field and a data field, and an aggregate format communicated through the trunk network port that includes a packet that includes an aggregate header field and a list with variable-length entries each including at least one data field from the plurality of tributary packets.

3. The system of claim 1 wherein the packet translator is configured to translate data between a tributary format communicated through the tributary network ports that includes a plurality of tributary packets that each include a header field and a data field, and an aggregate format communicated through the trunk network port that includes a packet that includes an aggregate header fields that includes an aggregate packet format update field, and a list including the data field of each of the tributary packets, wherein the aggregate packet format update field includes an indication of a change in the aggregate packets and a reference to a position in the list.

4. The system of claim 1 wherein the packet translator is configured to translate data between a tributary format communicated through the tributary network ports that includes a plurality of tributary packets that each include a header field and a data field, and an aggregate format communicated through the trunk network port that includes a packet that includes an aggregate header field, that includes an aggregate packet format update field, and a list including the data field of each of the tributary packets, wherein the aggregate packet format update field includes an indication of an addition of data from a tributary packet, of an additional tributary packet stream, in the aggregate packet, a reference to a position in the list, and a destination derived from the tributary packet.

5. The system of claim 1 wherein the packet translator is configured to translate data between a tributary format communicated through the tributary network ports that includes a plurality of tributary packets that each include a header field and a data field, and an aggregate format communicated through the trunk network port that includes a packet that includes an aggregate header field, that includes an aggregate packet format update field, and a list including the data field of each of the tributary packets, wherein the aggregate packet format update field includes an indication of a deletion of a data field, from a tributary packet stream, in the aggregate packet and a reference to a position in the list.

6. The system of claim 1 wherein the packet translator is configured to translate data between a tributary format communicated through the tributary network ports that includes a plurality of tributary packets that each include a compressed header field compressed according to a single-destination header compression method and a data field, and an aggregate format communicated through the trunk network port that includes a packet that includes a aggregate header field and the plurality of data fields.

7. The system of claim 1 further including means responsive to an acknowledgment of receipt of a change tag having a value to cause the packet translator to assemble aggregate packets with the change tag having the value until the system receives the acknowledgement of receipt of the change tag.

8. The system of claim 1 wherein the packet translator includes means for inserting a header checksum in the aggregate packet.

9. The system of claim 1 further including means responsive to a fragmentation indication to reduce a size of the aggregate packet.

10. The system of claim 1 wherein the tributary header data are a portion of the information of the tributary header field.

11. A network communication method, including the steps of:
  assembling for each of first, second and third aggregate packets a list that includes a plurality of data fields from a plurality of tributary packets,
  providing for each of the first, second and third aggregate packets a respective header,
  assembling for the header of the second aggregate packet a first change tag indicating a change associated with the list of the second aggregate packet relative to the first aggregate packet,
  assembling, for the header for the third aggregate packet, a second change tag indicating a change associated with the list of the third aggregate packet relative to the second aggregate packet; and
  sending the aggregate packets over a network from a source to a destination according to destination information.

12. The method of claim 11 further including the step of receiving tributary packets from different tributary nodes each including a header and a data field and wherein the step of assembling a list includes assembling the data fields from the tributary packets to form the list of data fields and wherein the first change tag includes destination information derived from a tributary packet associated with the first change tag.

13. The method of claim 12 wherein the step of receiving tributary packets receives tributary packets from a single-destination connection that employs header compression.

14. The method of claim 11 further including the step of receiving an acknowledgement of receipt of a change tag, and wherein the step of sending sends aggregate packets with change tags having identical values until the step of receiving an acknowledgement.

15. The method of claim 11 wherein the step of sending sends a header checksum in each of the aggregate packets.

16. The method of claim 11 wherein the steps of assembling and sending operate on data fields that include real-time digitized information.

17. The method of claim 11 wherein the steps of assembling and sending operate on data fields that include digitized voice signals.

18. The method of claim 11 further including the steps of receiving a fragmentation indication after the step of sending, and reducing a size of the aggregate packets in response to the fragmentation indication.

19. The method of claim 11 wherein the step of assembling a list assembles a list with variable-length entries.

20. The method of claim 11 wherein the step of assembling a list assembles a list with some null entries.

21. The method of claim 11 further including the steps of interpreting the first change tag at the destination, and retrieving data from the fields based on the contents of the first change tag.

22. The method of claim 21 herein the step of assembling the first change tag assembles an add tag that identifies a new field in the list, and wherein the retrieving step responds to the add tag by retrieving data from the new field.

23. The method of claim 21 wherein the step of assembling the first change tag assembles a delete tag that identifies a deleted field in the list, and wherein the retrieving step responds to the delete tag by ceasing to retrieve data from the deleted field.

24. The method of claim 21 further including the step of constructing tributary packets from the data fields retrieved in the step of retrieving using destination information obtained from the first change tag.

25. The method of claim 24 further including the step of sending the packets constructed in the step of constructing to a tributary node over a connection that employs header compression.

26. The method of claim 11 wherein the first change tag indicates a position of the change associated with the list of the second aggregate packet.

27. A network communication method, including the steps of:
    receiving, at a destination, first, second, and third aggregate packets each including a header and a list that includes a plurality of data fields, and wherein at least the second and third aggregate packets include first and second change tags indicating a position in the list of the second aggregate packet associated with a change relative to the list of the first aggregate packet and a position in the list of the third aggregate packet associated with a change relative to the list of the second aggregate packet, respectively,
    interpreting the change tags, and
    retrieving different data fields from different ones of the aggregate packets at the destination based on the contents of the change tags.

28. The method of claim 27 further including the step of constructing tributary packets from the data fields retrieved in the step of retrieving using destination information obtained from the change tags.

29. The method of claim 28 further including the step of sending the packets constructed in the step of constructing over a connection that employs header compression.

30. The method of claim 27 further including the step of acknowledging receipt of a change tag.

31. The method of claim 27 further including the step of verifying a header checksum in each of the aggregate packets.

32. The method of claim 27 wherein the steps of receiving and retrieving operate on data fields that include real-time digitized information.

33. The method of claim 27 wherein the steps of receiving and retrieving operate on data fields that include digitized voice signals.

34. The method of claim 27 further including the steps of detecting fragmentation of the aggregate packets and providing a fragmentation indication.

35. The method of claim 27 wherein at least one of the change tags is an add tag that identifies a new field in the list, and wherein the retrieving step responds to the add tag by retrieving data from the new field.

36. The method of claim 27 wherein at least one of the change tags is a delete tag that identifies a deleted field in the list, and wherein the retrieving step responds to the delete tag by ceasing to retrieve data from the deleted field.

37. The method of claim 27 wherein the step of retrieving retrieves variable length entries from the list.

38. A memory for storing data for access by a node on a network, including:
    a first aggregate packet structure stored in the memory, the first aggregate packet structure including:
        a first list that includes a plurality of separate data fields stored in the memory,
        a first header stored in the memory that includes destination information for the first aggregate packet, and
        a first change tag stored in the memory, the change tag including a position indication stored in the memory and indicating a position in the first list of a change relative to a list of another aggregate packet; and
    a second aggregate packet structure stored in the memory, the second aggregate packet structure including:
        a second list that includes a plurality of separate data fields stored in the memory,
        a second header stored in the memory that includes destination information for the second aggregate packet, and
        a copy of the first change tag stored in the memory, the-copy of the change tag again including a position indication stored in the memory and indicating a position in the second list of a change relative to the list of another aggregate packet.

39. The memory of claim 38 wherein the first change tag includes one of an add tag and a subtract tag stored in the memory.

40. The memory of claim 38 wherein the aggregate packet further includes a header checksum stored in the memory.

41. A network communication system, comprising:
    a plurality of tributary network ports,
    a trunk network port, and
    a packet translator operatively connected between the tributary network ports and the trunk network port, the packet translator including means for translating between packets of a tributary format communicated through the tributary network ports that includes a plurality of tributary packets that each include a tributary header field and a data field, and an aggregate format communicated through the trunk network port that includes a packet that includes an aggregate header field and the data field of each of the tributary packets, the aggregate header including less than all information of the tributary header of at least one of the tributary packets associated with the aggregate packet;
    wherein the aggregate header field includes tributary header data from a tributary header only if the tributary header data is relatively new to the packet translator, and wherein the tributary header data is considered relatively new if the packet translator has not received an indication of receipt of the tributary header data.

42. A network communication system, comprising:
    a plurality of tributary network ports,
    a trunk network port, and
    a packet translator operatively connected between the tributary network ports and the trunk network port, the packet translator configured to translate data between a tributary format, communicated through the tributary network ports, of a plurality of tributary packets that each include a tributary header field and a data field, and an aggregate format of an aggregate packet communicated through the trunk network port that includes an aggregate header field and the data field of each of the tributary packets;

wherein the packet translator produces the aggregate header using less than all header information from a particular tributary header if information for producing the particular tributary header has previously been sent in another aggregate packet by the packet translator; and wherein the aggregate header field includes tributary header data from a tributary header only if the tributary header data is relatively new to the packet translator, and wherein the tributary header data is considered relatively new if the packet translator has not received an indication of receipt of the tributary header data.

43. The system of claim 42 wherein the packet translator uses none of the header information from the particular tributary header if the information for producing the particular tributary header has previously been sent in another aggregate packet by the packet translator.

44. The system of claim 42 wherein the packet translator produces the aggregate header without using header information from the particular tributary header that a receiving device can reconstruct.

* * * * *

UNITED STATES PATENT AND TRADEMARK OFFICE
CERTIFICATE OF CORRECTION

PATENT NO.     : 6,438,137 B1
DATED          : August 20, 2002
INVENTOR(S)    : Turner et al.

It is certified that error appears in the above-identified patent and that said Letters Patent is hereby corrected as shown below:

Title page illustrative figure and Drawing Sheet 2 of 2, please replace Figure 3 with the attached corrected Figure 3.

<u>Column 9,</u>
Line 29, "fields that" should read -- fields, that --.

<u>Column 10,</u>
Lines 6 and 7, "tag having a value to" should read -- tag, having a value, to --.

<u>Column 12,</u>
Line 27, "the-copy" should read -- the copy --.

Signed and Sealed this

Twenty-ninth Day of July, 2003

JAMES E. ROGAN
*Director of the United States Patent and Trademark Office*

(12) United States Patent
Turner et al.

(10) Patent No.: US 6,438,137 B1
(45) Date of Patent: *Aug. 20, 2002

(54) PACKET-BASED TRUNKING (75) Inventors: R. Brough Turner, Newton Corner; Harry Norris, Maynard, both of MA (US); Julius Rothschild, Des Plaines, IL (US)

(73) Assignee: NMS Communications Corporation, Framingham, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,305

(22) Filed: Dec. 22, 1997

(51) Int. Cl.[7] ............................. H04J 3/16; H04J 3/22
(52) U.S. Cl. ............................. 370/466; 370/471
(58) Field of Search ......................... 370/466, 464, 370/465, 467, 468, 469, 470, 471, 474, 355, 356, 354, 400, 401, 402, 389, 392

(56) References Cited

U.S. PATENT DOCUMENTS

| | | | | |
|---|---|---|---|---|
| 5,583,855 A | * | 12/1996 | Ball | 370/376 |
| 5,666,362 A | * | 9/1997 | Chen et al. | 370/420 |
| 5,781,743 A | * | 7/1998 | Matsuno et al. | 709/228 |
| 5,917,828 A | * | 6/1999 | Thompson | 370/474 |
| 5,926,477 A | * | 7/1999 | Shirokura et al. | 370/395 |
| 5,940,598 A | * | 8/1999 | Strauss et al. | 370/466 |
| 5,946,309 A | * | 8/1999 | Westberg et al. | 370/395 |
| 5,987,022 A | * | 11/1999 | Geiger et al. | 370/477 |
| 6,002,692 A | * | 12/1999 | Wills | 370/465 |
| 6,005,871 A | * | 12/1999 | Petersen et al. | 370/474 |
| 6,016,507 A | * | 1/2000 | Carroll et al. | 709/217 |
| 6,018,530 A | * | 1/2000 | Chakravorty | 370/471 |
| 6,061,329 A | * | 5/2000 | Abe | 370/228 |
| 6,061,349 A | * | 5/2000 | Coile et al. | 370/389 |
| 6,198,751 B1 | * | 3/2001 | Dorsey et al. | 370/466 |

* cited by examiner

*Primary Examiner*—Dang Ton
*Assistant Examiner*—Brian Nguyen
(74) *Attorney, Agent, or Firm*—Mintz, Levin, Cohn, Ferris, Glovsky & Popeo, P.C.

(57) ABSTRACT

A network communication system includes a packet translator operatively connected between a tributary network port and a trunk network port. A tributary format is communicated through the tributary network ports and includes tributary packets that each include a header field and a data field. An aggregate format is communicated through the trunk network port, and includes a packet that includes an aggregate header field and the data fields.

44 Claims, 2 Drawing Sheets

Fig. 3

Fig. 3   Fig. 4